(12) United States Patent
Guo et al.

(10) Patent No.: US 9,900,824 B2
(45) Date of Patent: Feb. 20, 2018

(54) RESOURCE AWARE ROUTING IN HETEROGENEOUS WIRELESS NETWORKS

(71) Applicant: Mitsubishi Electric Research Laboratories, Inc., Cambridge, MA (US)

(72) Inventors: Jianlin Guo, Newton, MA (US); Philip Orlik, Cambridge, MA (US); Kieran Parsons, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 336 days.

(21) Appl. No.: 14/635,444

(22) Filed: Mar. 2, 2015

(65) Prior Publication Data
US 2016/0262081 A1    Sep. 8, 2016

(51) Int. Cl.
| | |
|---|---|
| *H04W 40/12* | (2009.01) |
| *H04W 24/08* | (2009.01) |
| *H04W 40/04* | (2009.01) |
| *H04W 40/10* | (2009.01) |

(52) U.S. Cl.
CPC ........... *H04W 40/12* (2013.01); *H04W 24/08* (2013.01); *H04W 40/04* (2013.01); *H04W 40/10* (2013.01); *Y02B 60/50* (2013.01)

(58) Field of Classification Search
CPC ..... H04W 24/08; H04W 40/12; H04W 40/04; H04W 52/0261; H04L 45/302
See application file for complete search history.

(56) References Cited

U.S. PATENT DOCUMENTS

| | | | | |
|---|---|---|---|---|
| 8,509,109 | B2* | 8/2013 | Guo | H04W 40/02 370/252 |
| 2011/0116389 | A1* | 5/2011 | Tao | H04L 45/18 370/252 |
| 2012/0117208 | A1 | 5/2012 | Shaffer et al. | |
| 2012/0230204 | A1* | 9/2012 | Vasseur | H04W 40/22 370/242 |
| 2013/0121335 | A1 | 5/2013 | Hui et al. | |
| 2013/0208583 | A1* | 8/2013 | Guo | H04W 40/22 370/225 |
| 2014/0126423 | A1 | 5/2014 | Vasseur et al. | |

(Continued)

OTHER PUBLICATIONS

Ko et al. "RPL Routing Pathology in a Network with a Mix of Nodes Operating in Storing and Non-Storing Modes" Networking Working Group, Standards Track. Internet Draft, Feb. 12, 2014. https://tools.ietf.org/html/draft-ko-roll-mix-network-pathology-04.

*Primary Examiner* — Redentor Pasia
(74) *Attorney, Agent, or Firm* — Gene Vinokur; James McAleenan; Hironori Tsukamoto

(57) ABSTRACT

A method for routing packets in a multi-hop wireless heterogeneous network including nodes with different computational and energy resources includes monitoring a set of parameters of an operation of a node in the network, wherein the operation includes routing packets to the nodes of the network according to a mode of operation (MOP) specifying a type of the routing and modifying the MOP of the node in response to detecting a change in at least one parameter of the operation. The information about the modified MOP is broadcasted to the network and the packets are routed to the nodes according to the modified MOP.

18 Claims, 17 Drawing Sheets

(56) References Cited

U.S. PATENT DOCUMENTS

2014/0269402 A1* 9/2014 Vasseur ................ H04L 45/302
370/253
2015/0043384 A1 2/2015 Hui et al.
2015/0193697 A1* 7/2015 Vasseur ................ G06N 99/005
706/12

* cited by examiner

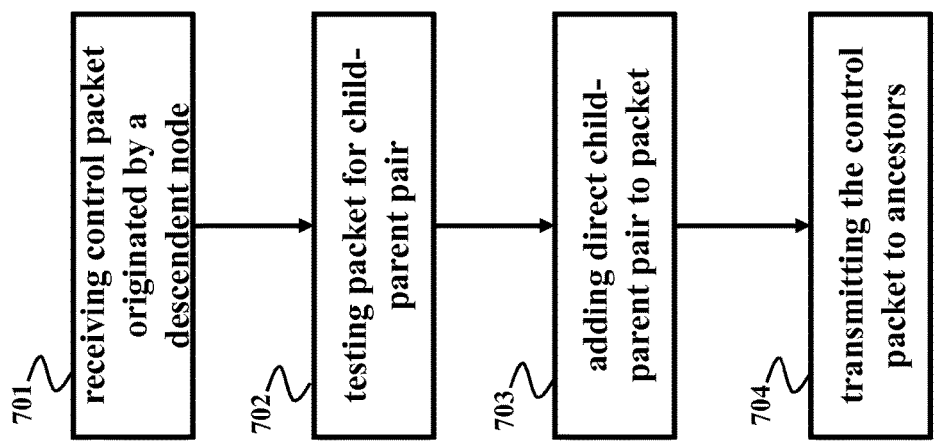

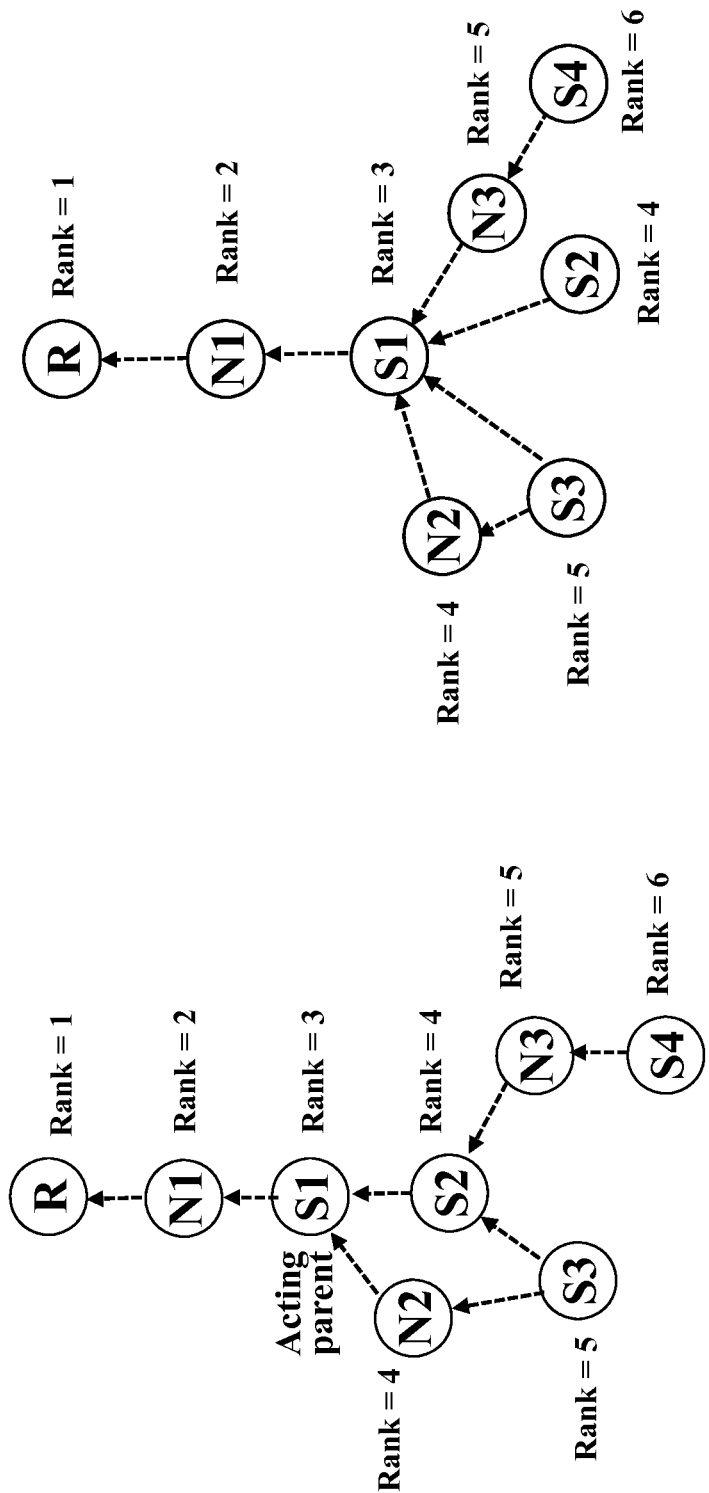

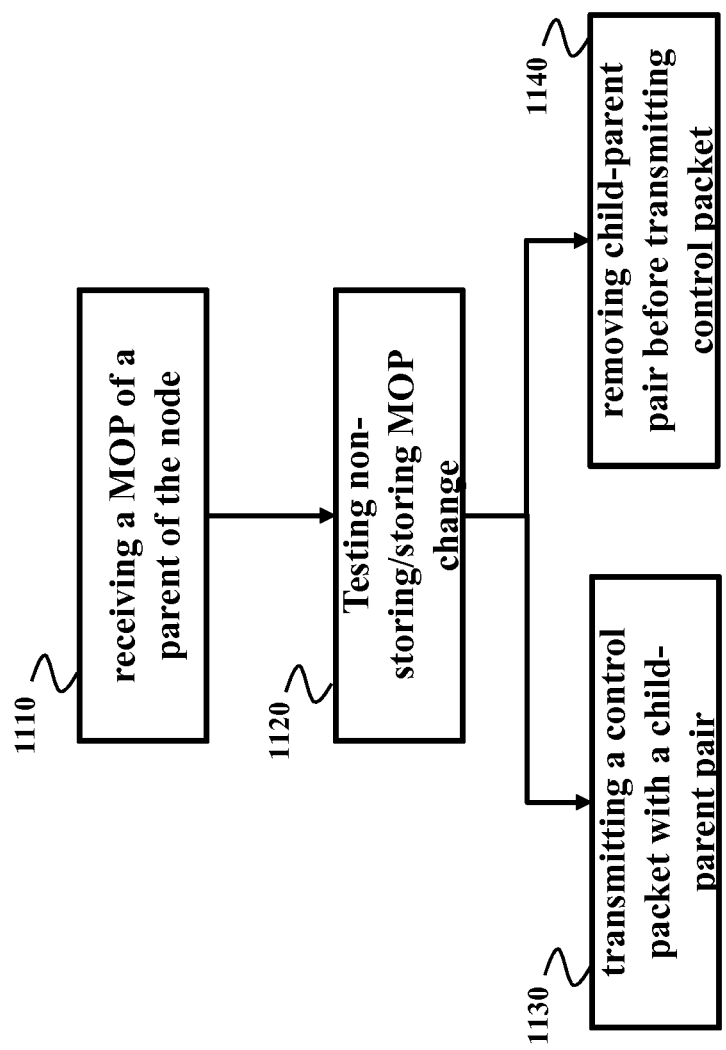

RESOURCE AWARE ROUTING IN HETEROGENEOUS WIRELESS NETWORKS

FIELD OF THE INVENTION

This invention relates generally to routing packets in wireless networks, and particularly to routing packets in wireless networks containing nodes with heterogeneous resources and capabilities.

BACKGROUND OF THE INVENTION

Based on resource and capability of a node in a wireless network, the wireless networks can be classified as a homogeneous or a heterogeneous network. In the homogeneous wireless network, such as a conventional wireless sensor network, all nodes have identical resources and capabilities. On the other hand, in the heterogeneous wireless network, such as wireless machine-to-machine (M2M) network, nodes have different resources and capabilities.

Heterogeneous wireless networks are used in emerging applications including Internet of Things (IOT), industrial automation and smart grids. Some nodes in the heterogeneous wireless networks have sufficient resources, such as memory, storage, process power, energy supply, and communication capability. Other nodes have constrained resources and capabilities. As a result, functions of the nodes in a heterogeneous network can vary. Some nodes can perform many functions and other nodes can only perform limited functions.

A network node represents a physical device. Once the physical device is manufactured, it can be impractical to change its resources and capabilities. This requires technologies running on devices to adapt their functionality to the device. Routing is one of networking technologies to configure a network topology and communicate packets in the network. With an identical set of nodes, different routing algorithm can form different networks that function differently. Some routing algorithms configure efficient networks and some routing algorithms configure inefficient networks.

Conventional routing methods designed for homogeneous wireless network do not consider heterogeneity in the nodes and may not be suitable for nodes with limited resources, or waste resources of more powerful nodes. For example, if the routing method is designed and developed to adopt more powerful nodes, then this routing method cannot be used by less powerful nodes, which can lead to node isolation. If the routing method is designed and developed based on the average powerful nodes, then resources on more powerful nodes are wasted, and resources on less powerful nodes may also prevent those nodes from joining the network.

For example, Ad-hoc On-demand Distance Vector (AODV) routing assumes that nodes have sufficient memory and requires a node to store routing information for every route request and route response received. A node stores forward route entry and also stores reverse routing information. In a large scale network, AODV requires nodes to have a relatively large memory capacity. Thus, sensor nodes cannot easily support AODV based routing algorithms.

The IPv6 Routing Protocol for Low Power and Lossy Networks (RPL) is a recent routing protocol developed by the Internet Engineering Task Force (IETF) and published as standard RFC 6550. The RPL routing protocol considers memory capacity of the nodes and classifies routing mechanism into four mode of operation (MOP): MOP-0, MOP-1, MOP-2 and MOP-3. With MOP-0, RPL only supports uni-directional routing from the nodes to a root node, i.e., upward routing. MOP-1 allows bi-directional routing and uses source routing for downward routing. To reduce memory capacity, a MOP-1 node does not store routing information for any other node. As a result, the MOP-1 is called a non-storing mode. MOP-2 supports bi-directional routing and uses a routing table for downward routing. A MOP-2 node stores route entries for nodes in a sub-tree. Therefore, the MOP-2 is called a storing mode. However, with MOP-2, downward multicast is not supported. The MOP-3 does support downward multicast. Therefore, the MOP-3 is also called a storing mode. The MOP-2 and MOP-3 require node to have larger memory capacity to store route entries.

However, the RPL only allows one MOP for all router nodes in a network and does not allow router nodes to have different MOPs. All router nodes must have same MOP as the root node. If a node has a MOP different from the MOP of the root node, then this node can only be a leaf node and cannot extend the network.

Accordingly, it is desirable to provide a resource aware routing method that adapts its routing functions based on different resources and capabilities of the nodes.

SUMMARY OF THE INVENTION

Some embodiments of the invention are based on a recognition that in a wireless multi-hop network, nodes with different resources can have different modes of operation (MOP) defining a type of routing used by the node. For example, the MOP can define that node uses one or bi-directional routing, storing or non-storing routing.

Some embodiments of the invention are based on a realization that nodes can update its MOP in response to a change in available resources, such as one or combination of an available memory of the node, processing power of the node, available amount of energy for the node, a communication capability of the node, and an MOP of at least one neighboring node. It is further realized that different MOPs can correspond to different resources in a predetermined manner, when more resources are available to a node, then the functions of the MOP can be increased. In such a manner, the nodes can signal its MOP to other nodes as an indication of available resources.

In some embodiments of the invention, the nodes perform routing in consideration of the resources of other nodes as indicated by their MOPs. Also, some embodiments use the notion of virtual or acting parenting to facilitate merging of nodes with different MOPs. For example, in one embodiment, a node with one MOP can signal to other nodes in the network that the node is a parent of a neighboring child node of different MOP, when in fact that child node is multi-hopes away from the parent node.

Some embodiments of the invention adapt the routing methods to changes in a state of the network by having a heterogeneous network including nodes with different MOPs and modifying MOP of at least one node in response to a change of parameters of operations of the node.

Accordingly, one embodiments of the invention discloses a method for routing packets in a multi-hop wireless heterogeneous network including nodes with different computational and energy resources including monitoring a set of parameters of an operation of a node in the network, wherein the operation includes routing packets to the nodes of the network according to a mode of operation (MOP) specifying a type of the routing; modifying the MOP of the node in response to detecting a change in at least one parameter of the operation; broadcasting information about the modified MOP to the network; and routing the packets to the nodes according to the modified MOP, wherein steps of the method are performed using a processor of the node.

Another embodiment discloses a multi-hop wireless network including multiple nodes with different computational and energy resources, wherein the nodes operate according to different mode of operation (MOP) specifying types of routing, wherein at least one node in the network modifies the MOP of the node in response to a change of a parameter of operation of the node.

Yet another embodiment discloses a node for routing packets in a heterogeneous wireless network including a battery for supplying energy to the node; a transceiver for transmitting and receiving packets; a memory for storing at least part of the packets; and a processor for monitoring one or combination of an available amount of energy of the power supply and an available portion of the memory and for determining a mode of operation (MOP) of the node specifying a type of routing of the packets based on one or combination of the available amount of energy and the available portion of the memory.

BRIEF DESCRIPTION OF THE DRAWINGS

FIG. 7B is a block diagram of a method for specifying child-parent relationship defining the active parenting according to some embodiments of the invention;

FIG. 9A is a schematic of an example of network with rank assignments and acting parent in heterogeneous wireless networks according to some embodiments of an invention;

FIG. 9B is a schematic of an example of the compressed network converted from the network in FIG. 9A according to some embodiments of an invention;

FIG. 11 is a block diagram of an adaptive MOP change of the node according to some embodiments of the invention.

DETAILED DESCRIPTION OF THE PREFERRED EMBODIMENTS

Figure 1:
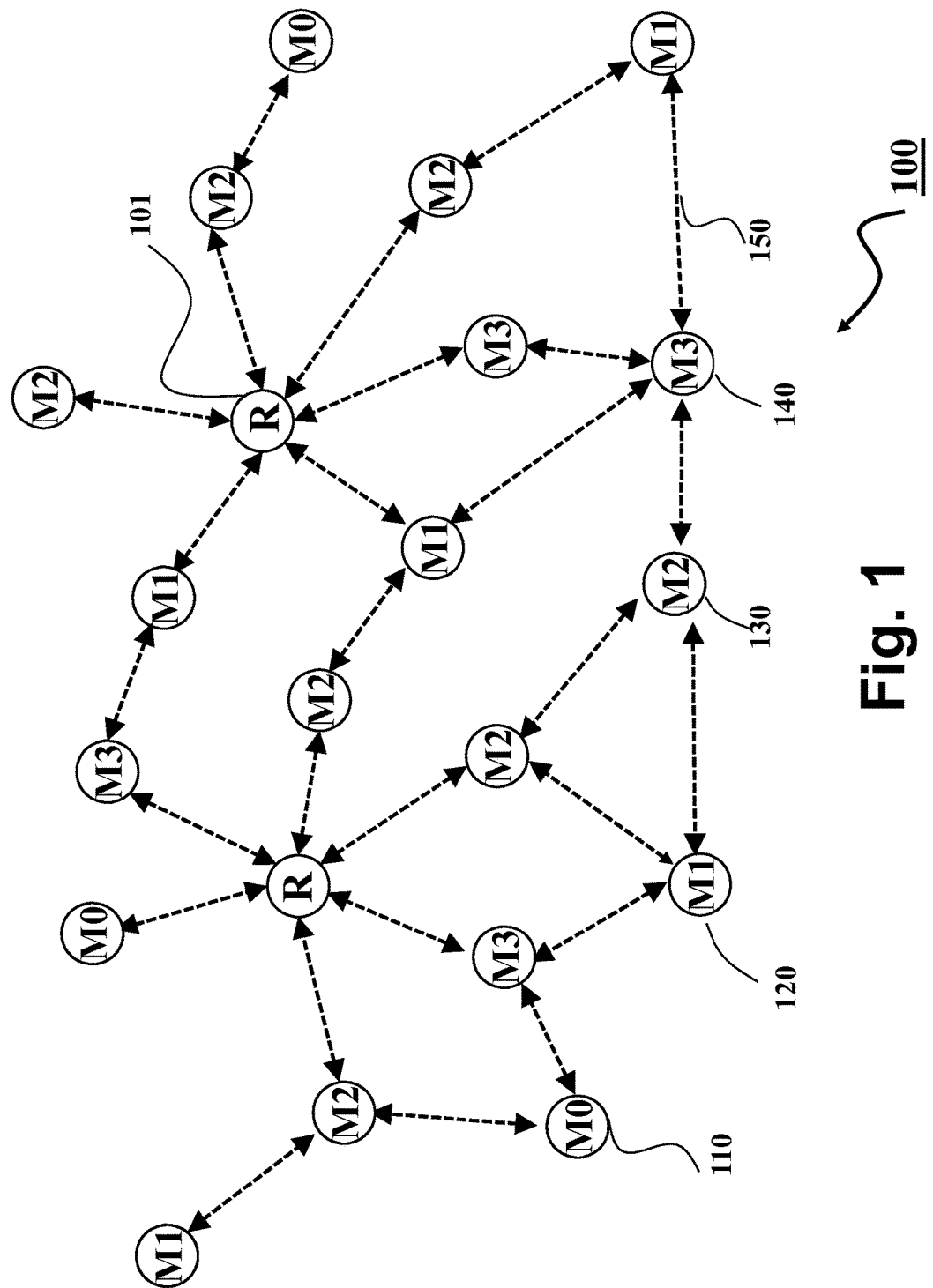
FIG. 1 is a schematic of the heterogeneous multi-hop wireless network according to some embodiments of the invention.

FIG. 1 shows a schematic of the heterogeneous multi-hop wireless network 100 according to some embodiments of the invention. The network includes multiple nodes with different computational and energy resources. Some nodes can transmit packets directly to any root, while some of nodes cannot directly transmit packets to any root. Instead, the packets are first transmitted to intermediate or relay nodes, which then relay the packets to roots. In other words, packet transmission is conducted in a multi-hop manner.

The nodes in the network 100 operate according to different mode of operation (MOP) specifying types of routing. For example, the MOP of different nodes can be a non-storing MOP or a storing MOP. The node operating according to the non-storing MOP, also referred herein as a non-storing node, does not store a routing table, and the node operating according to the storing MOP, also referred herein as a storing node, stores the routing table and child-parent table specifying child-parent pairs for at least part of the network.

For example, the network 100 includes root nodes (R) 101, MOP-0 nodes (M0) 110, MOP-1 nodes (M1) 120, MOP-2 nodes (M2) 130, and MOP-3 nodes (M3) 140. The nodes and roots form a wireless mesh network using wireless links 150. The direction of link shows physical node reachability.

At least one node in the network 100 modifies the MOP of the node in response to a change of a parameter of operation of the node. In such a manner, the node can dynamically adjust its routing functions based on network conditions and resources available to the node.

Figure 2A:
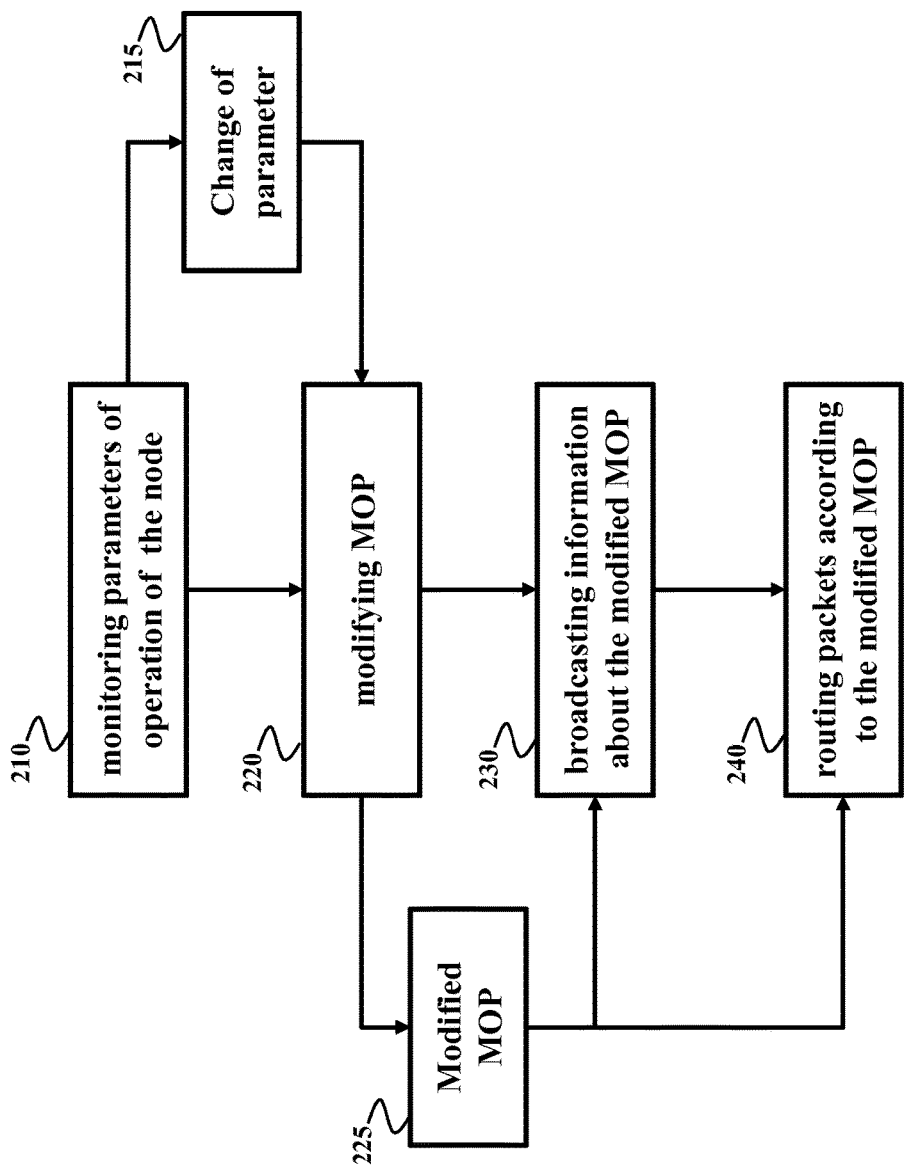
FIG. 2A is a block diagram of a method for routing packets in the multi-hop wireless heterogeneous network according to some embodiments of the invention.

FIG. 2A shows a block diagram of a method for routing packets in a multi-hop wireless heterogeneous network including nodes with different computational and energy resources according to some embodiments of the invention. The method includes monitoring 210 a set of parameters of an operation of a node in the network, wherein the operation includes routing packets to the nodes of the network according the MOP of the node and modifying 220 the MOP of the node in response to detecting a change 215 in at least one parameter of the operation.

In some embodiments the method broadcasts 230 to the network information about the modified MOP 225 and routes 240 the packets to the nodes of the network according to the modified MOP 225. In some embodiments, the modified MOP of the node indicates the resources available to the node. For example, different MOPs correspond to different resources in a predetermined manner, i.e., if more resources are available to node then greater the functions MOP. Therefore, the broadcasting 230 allows to other nodes of the network to adapt its routing to the resources of the node.

Figure 2B:
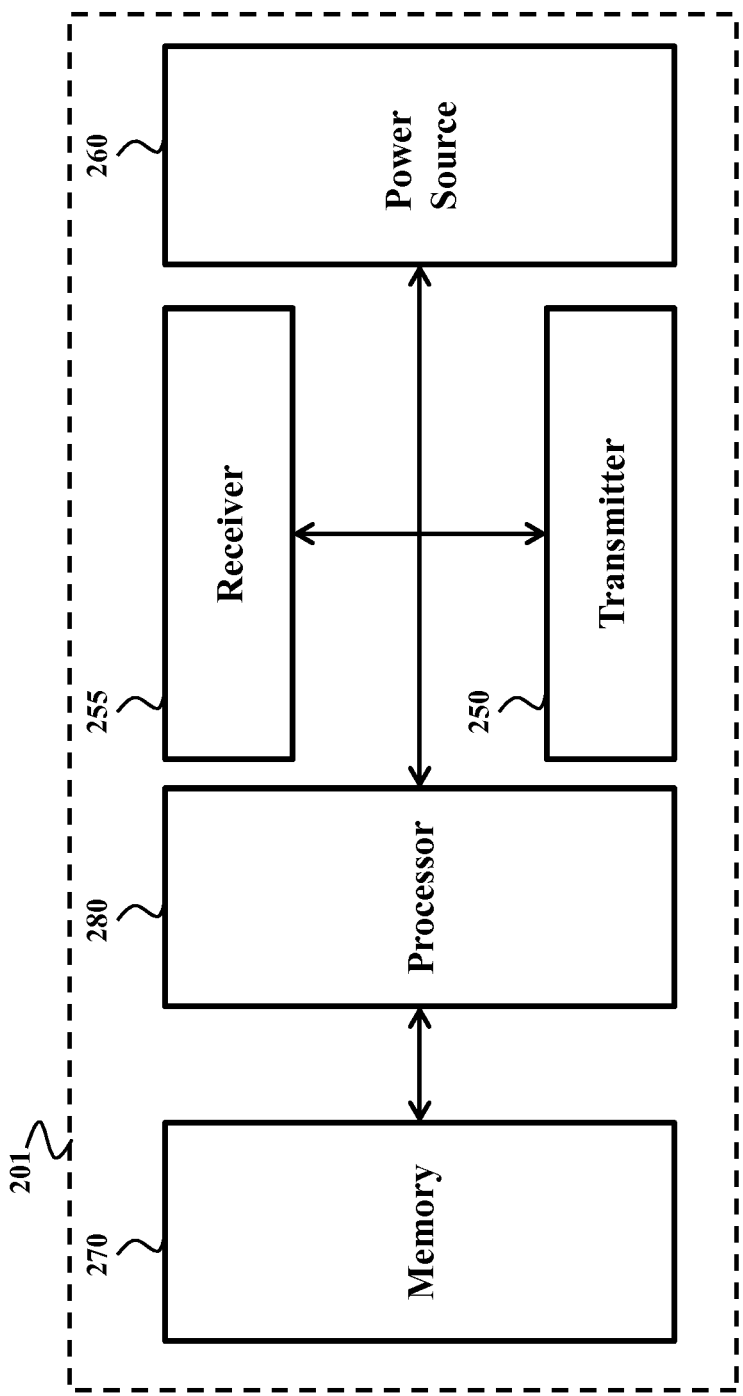
FIG. 2B is a schematic of a structure of the node that can participate in forming the network of FIG. 1 according to some embodiments of the invention.

FIG. 2B shows schematically a structure of the node 201 that can participate in forming the network of FIG. 1. The node includes a transceiver for transmitting and receiving packets, such as data and control packets. The transceiver can include one or combination of a receiver 255 and a transmitter 250. The node can include a power source 260, such as a battery, for supplying energy to the node and a memory 270 for storing at least part of the packets received or transmitted by the transceiver.

The node also includes a processor 280 for monitoring parameters of operation of the node and determining or modifying the MOP of the node. For example, the set of parameters can include one or combination of an available memory of the node, a processing power of the node, an available amount of energy for the node, a communication capability of the node, and an MOP of at least one neighboring node.

For example, the processor 280 can monitor an available amount of energy of the power supply and/or an available portion of the memory and can determine the MOP of the node based on the available amount of energy and/or the available portion of the memory. The processor can also command the transceiver to broadcast information about the MOP to the network in response to modifying the MOP.

Some embodiments use four different types of MOP, i.e., MOP-0, MOP-1, MOP-2 and MOP-3. For example, a node with random access memory (RAM) much less than 10 KB (=1024 bytes) and read only memory (ROM) much less than 100 KB sets its MOP to 0. This class of the nodes cannot support downward routing. A node with about 10 KB RAM and about 100 KB ROM can choose to set its MOP to 0 or 1. This class of the nodes can perform non-storing downward routing. A node with about 50 KB RAM and about 250 KB ROM can choose to set its MOP to 0, 1, or 2. This class of nodes can perform storing downward routing, but may not support downward multicast. A node with RAM much greater than 50 KB and ROM much greater than 250 KB can choose to set its MOP to 0, 1, 2, or 3. This class of nodes can perform storing downward routing and have enough memory to support downward multicast.

A node can consider the resources other than RAM and ROM in determining its MOP. For example, A node with about 10% of the battery energy sets its MOP=0 regardless of RAM and ROM. A node with about 20% of the battery energy sets its MOP to 0 or 1 regardless of RAM and ROM. If the battery energy is greater than 20%, a node sets its MOP based on RAM and ROM.

A node can dynamically change its MOP based on its resources usage and network conditions. For example, a battery powered node with sufficient RAM and ROM can initially set its MOP to 3. During network operation, if its battery level gets low, the node can change its MOP to a lower value to avoid network tear down due to a dead node. Another example, a node with about 50 KB RAM and about 250 KB ROM initially sets MOP to 2. During network operation, if the node detects that its memory is not sufficient to store downward routing table and/or there are enough MOP-3 nodes in its vicinity, the node can lower its MOP value.

Figure 3A:
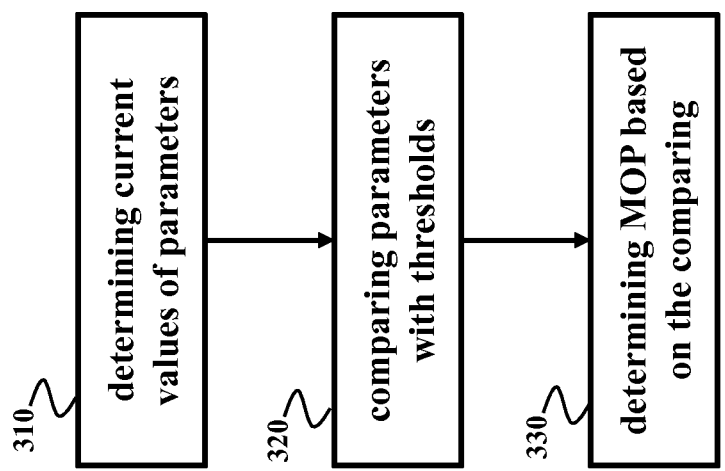
FIG. 3A is a block diagram of a method for determining and/or modifying the MOP of the node according to one embodiment of the invention.

FIG. 3A shows a block diagram of a method for determining and/or modifying the MOP of the node according to one embodiment of the invention. The embodiment determines 310 current values of the set of parameters of the operation of the node and compares 320 the set of parameters with a corresponding set of thresholds. For example, if the node monitors only two parameters, such as available energy and available memory, the set of thresholds can include two different thresholds, i.e., one threshold for the memory and another threshold for the energy. The node can also include multiple thresholds for each monitored parameter to determine one of the several possible types of the MOP.

The node determines 330 its MOP based on the results of the comparison. For example, the node can change its MOP if change of at least one parameter crosses the threshold. For example, the node can select the MOP corresponding to the lowest available resource.

Figure 3B:
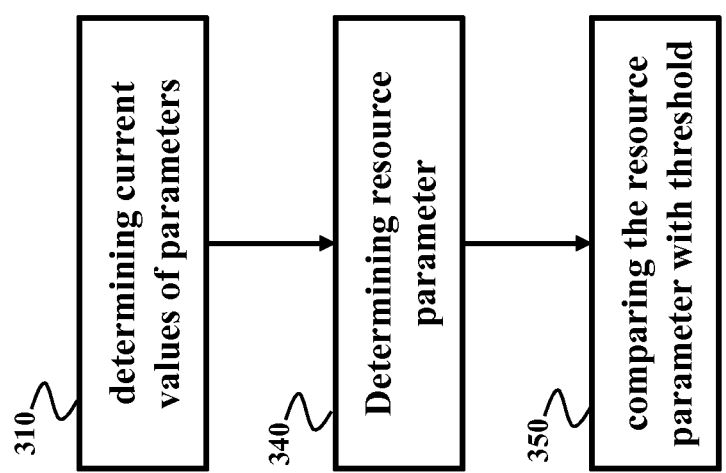
FIG. 3B is a block diagram of a method for determining and/or modifying the MOP of the node according to another embodiment of the invention.

FIG. 3B shows a block diagram of a method for determining and/or modifying the MOP of the node according to another embodiment of the invention. In this embodiment, the node determines 340 a resource parameter as a weighted combination of the current values of the set of parameters and compares 350 the resource parameter with a threshold to produce 340 the MOP of the node.

For example, the resource parameter can be determined according to $$RP = \left(\frac{AM}{MC}\right)^{CM} \times \left(\frac{AR}{RC}\right)^{CR} \times \left(\frac{EL}{ME}\right)^{CE} \times \left(\frac{1}{SS}\right)^{CN} \quad (1)$$

where RP is a combined resource and network condition parameter, AM is available RAM, MC is RAM capacity, AR is available ROM, RC is ROM capacity, EL is energy level, ME is the maximum energy level, SS represents the size of sub-tree of a node including the node itself, CM, CR, CE and CN are positive coefficients to reflect the importance of RAM, ROM, energy and network condition, respectively. Based on equation (1), three thresholds, $TH_0$, $TH_1$ and $TH_2$, can be defined for a node to change its MOP. For example, if the RP of a node decreases crossing $TH_0$, the node changes its MOP from 1 to 0. If the RP of a node increases crossing $TH_2$, the node changes its MOP from 2 to 3. The actual values of $TH_0$, $TH_1$ and $TH_2$ are application dependent.

RPL Overview

Because nodes in the network signal various resources by using different MOPs, some embodiment use a resource aware routing to route packets from nodes to the roots and from the roots to nodes. Some embodiments of the invention adapt RPL for the resource aware routing.

RPL organizes nodes in a network as a Directed Acyclic Graph (DAG) and partitions the DAG into one or more Destination Oriented DAGs (DODAGs). A DAG is partitioned such that a DODAG has only one data sink, which is also called the DODAG root. RPL uses different types of packets to build upward routes from nodes to the root and downward routes from the root to nodes.

To construct the DODAG topology and upward routes from nodes to the root, RPL uses the DODAG Information Object (DIO) packet, which is originated by the root and propagates to all nodes in the network. The DIO packet contains the information to construct the DODAG topology. For example, RPLInstanceID, DODAGID and DODAGVersionNumber are enclosed to identify a DODAG version, and the rank of a node defines the individual position of the node relative to other nodes with respect to the root of the DODAG. DIO packet also contains a MOP field to indicate MOP of a network. Value of MOP field is set by the root and other nodes are not allowed to change it. To propagate the DIO packet, the root broadcasts DIO packet. Nodes in the proximity of the root receive the DIO packets, determine their ranks when the nodes decide to join the DODAG, and broadcast updated DIO packets to their neighboring nodes.

DIO packets are propagated in all directions so that the DODAG topology is constructed in a wave front manner, until every node joins a DODAG.

To build downward routes from the root to other nodes, RPL uses Destination Advertisement Object (DAO) packet. The DAO packets are transmitted upwards. However, depending on the MOP of the network, content and destination of a DAO packet varies. With MOP-0, RPL does not support downward routing, and therefore, all nodes in the network do not transmit the DAO packet. With MOP-1, all nodes are only allowed to transmit non-storing DAO packet. In MOP-1, the destination of a DAO packet is the root. Therefore, source address and destination address are global IPv6 addresses. Non-storing DAO packet is relayed hop-by-hop to the root and intermediate nodes do not process received DAO packet and do not store any information. When a node operating on MOP-1 constructs a non-storing DAO packet, the node specifies its parents. The root uses this information to build downward routes for each node in the network. A node operating on MOP-1 does not store downward route information for any other node. Therefore, a node operating on MOP-1 is called as the non-storing node.

With MOP-2, all nodes are only allowed to transmit storing DAO packet. Unlike non-storing DAO, the destination of a storing DAO packet is the parents of the node, that is, a storing DAO is only transmitted over one hop. Therefore, source address and destination address of a storing DAO packet are link-local IPv6 addresses. In a storing DAO, a node does not specify its parent because a storing DAO is only transmitted to its parents. In MOP-2 mode, a node processes the received DAO packets and adds a route entry into its routing table for each destination contained in DAO packets. A node operating on MOP-2 is also responsible for generating new storing DAO packets to propagate destinations in its sub-DODAG to the root. Downward routing is then realized by intermediate nodes using their routing tables.

With MOP-3, downward routing mechanism is same as for MOP-2. A MOP-2 or MOP-3 node stores downward route information. Therefore, a node operating on MOP-2 or MOP-3 is also called as storing node. The DODAG Information Solicitation (DIS) packet is used to solicit a DIO from a RPL node, that is, to discover new routes.

RPL allows a node to have multiple parents, that is, multiple routes. One of the parents is selected as the preferred parent and others as backup parents. The preferred parent is used as default next hop for upward packet forwarding. If the preferred parent is unavailable, then the backup parents can be used. RPL uses Objective Functions (OF) for assisting nodes to determine ranks and select parents.

RPL requires all nodes that perform router role must have same MOP as the root does, that is, if the root set its MOP to 0, all router nodes must set their MOP to 0, if the root set its MOP to 1, all router nodes must set their MOP to 1; if the root set its MOP to 2, all router nodes must set their MOP to 2, and if the root set its MOP to 3, all router nodes must set their MOP to 3.

Resource Aware Routing

Some embodiments of the invention are based on recognition that nodes should perform its routing in consideration of the resources of other nodes as indicated by their MOPs. In addition, some embodiments are based on a realization that additionally or alternatively with the routing metric considering routes between two nodes, the resource aware metric should consider the quality of the entire route to leverage the heterogeneity of the nodes.

Figure 4A:
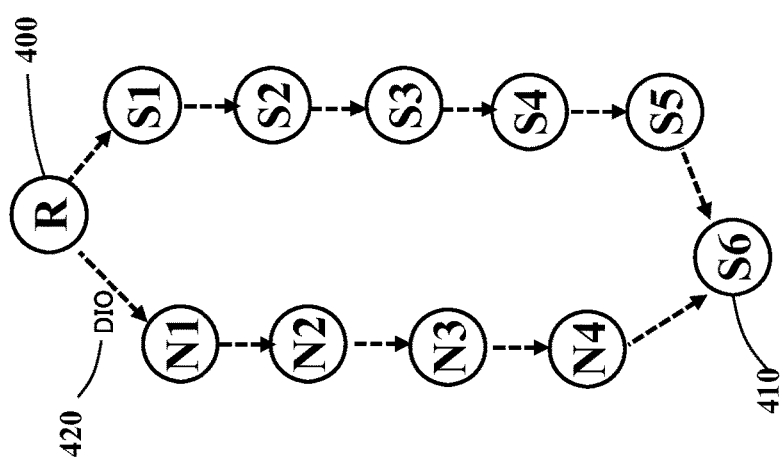
FIG. 4A is a schematic of an example of network employing principles of some embodiments of the invention.

FIG. 4A shows an example of network in which the DIO packet 420 propagates to node S6 410 from the root R 400 along two routes R1: R→N1→N2→N3→N4→S6 and R2: R→S1→S2→S3→S4→S5→S6, where N1 to N4 are non-storing nodes and S1 to S6 are storing nodes. With conventional hop count routing metric, node S6 would select route R1 as default route since R1 is shorter than R2. However, all intermediate nodes on R1 are non-storing nodes and all intermediate nodes on R2 are storing nodes. To send a downward packet from the root R to node S5 on R1, a source routing header N1→N2→N3→N4→S6 has to be attached to the packet. For IPv6 routing, this source routing header is at least 80 bytes long. On the other hand, if route R2 is used, no source routing header is needed, that is, packet overhead is reduced by at least 80 bytes. Therefore, some embodiments use a route with more storing nodes.

Therefore, some embodiments use a path level routing metric such as non-storing node count (NNC) of a route that counts the number of non-storing nodes on a route. During route discovery, the root sets NNC=0. A non-storing node increases BNC by 1 and a storing node does not change the value of NNC. In FIG. 4A, when DIO propagates to S6 along R1, NNC is 4 and when DIO propagates to S6 along R2, NNC is 0. Therefore, S6 knows R2 is more preferable route than R1.

Figure 4B:
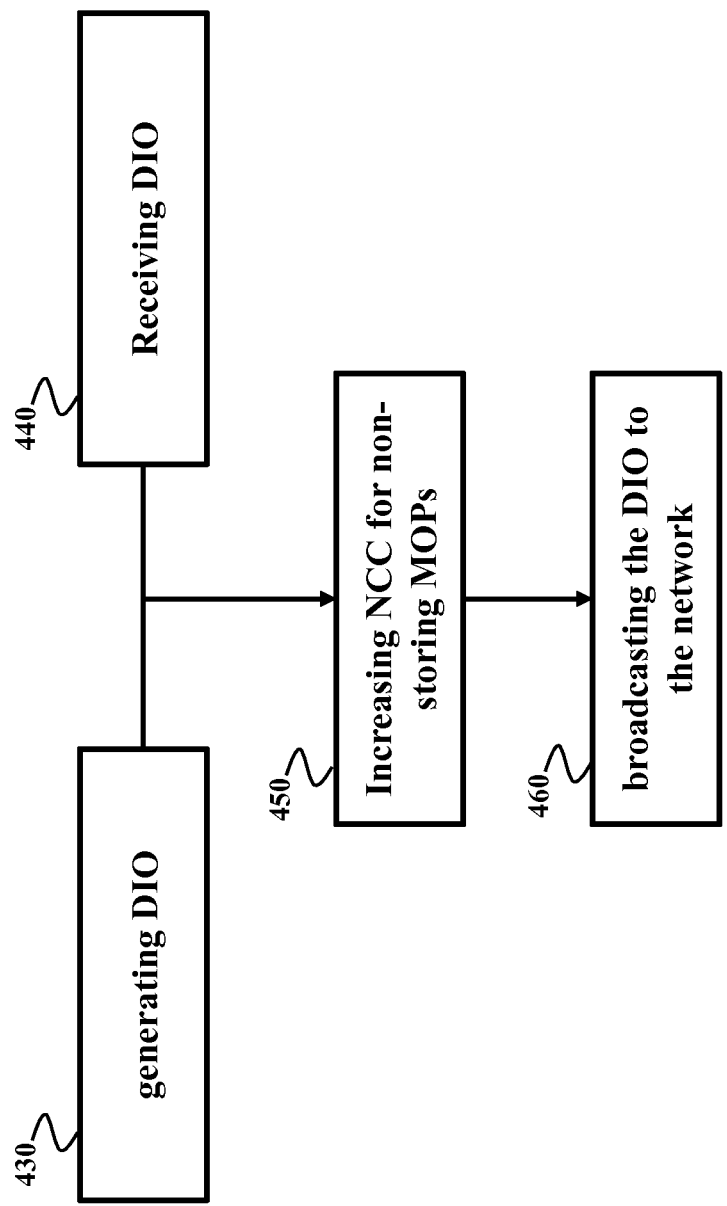
FIG. 4B is a block diagram of a method for propagating resource metric over the network according to some embodiments of the invention.

FIG. 4B shows a block diagram of a method for propagating NNC over the network according to some embodiments. For example, the node can generate 430 a control packet, such as a destination oriented directed acyclic graph information object (DIO) including the MOP of the node and add a non-storing node count (NNC) to the DIO. Additionally or alternatively, the node can receive 440 the NNC as part of the DIO originated by another node, such as a root node in the network. The node increases 450 the NNC by one if the MOP of the node is a non-storing MOP and broadcasts 460 the DIO to the network. If the MOP of the node is storing, the node broadcast the DIO without modifying the NCC. In one embodiment, if node received multiple DIO with different NNC, the minimal NNC is rebroadcasted.

Figure 4C:
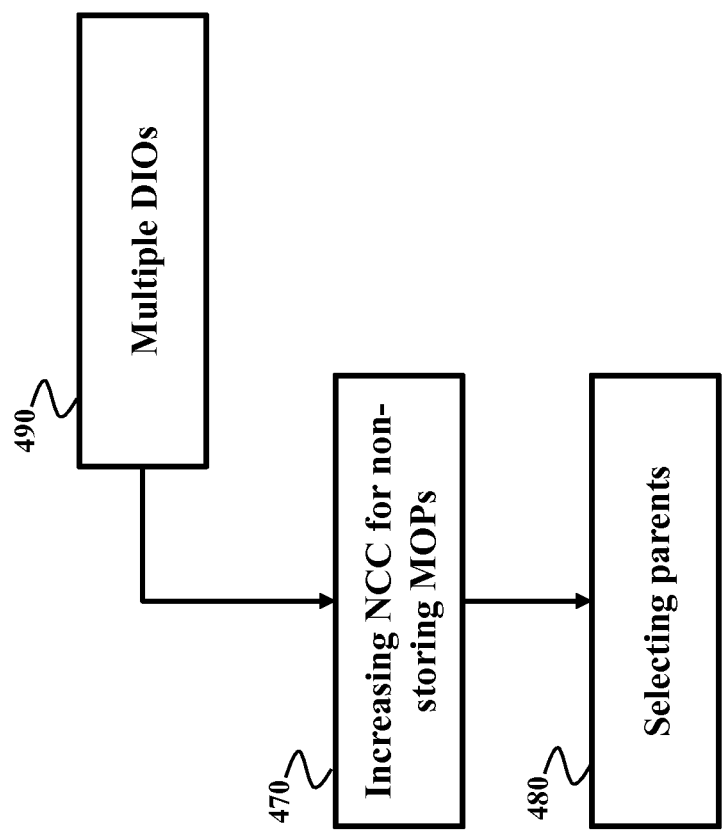
FIG. 4C is a block diagram of the method for using the resource metric to determine route according to some embodiments of the invention.

FIG. 4C shows a block diagram of the method for using NCC to determine route according to some embodiments of the invention. For example, the node receives 470 multiple copies 490 of DIO originated by a root node in the network. Each copy of the DIO is received from one of multiple neighboring nodes and includes the NNC that reflect the number of non-storing nodes on each path from the root to the neighboring node. Next, the node selects a subset of the neighboring nodes transmitting the DIO with smaller NNC as parents of the node.

Some embodiments of the invention construct DODAG topology leveraging resources of the node. DIO packet carries both conventional routing metrics and resource aware metric NNC. DIO packet is originated by the root. During DIO propagation, each node selects one default parent and multiple backup parents if these backup parents are available.

Figure 5:
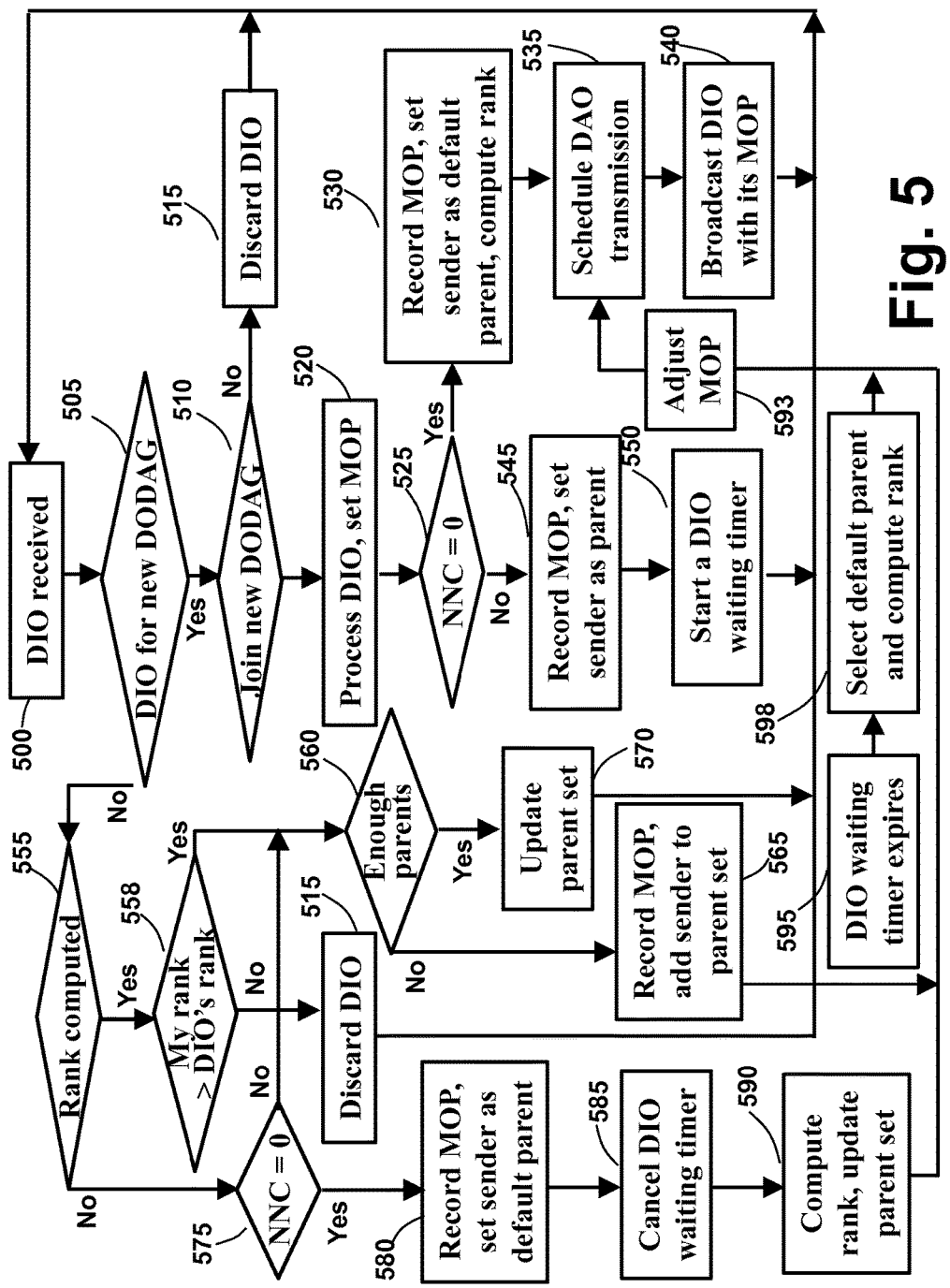
FIG. 5 is a block diagram of a method for resource aware route discovery according to one embodiment of the invention.

FIG. 5 shows a block diagram of a method for resource aware DODAG construction and upward route discovery according to one embodiment of the invention. When a node receives a DIO packet 500, the node checks 505 if this DIO is for a new DODAG or existing DODAG. If DIO is for a new DODAG, node decides 510 whether to join this DODAG or not. If the node does not join new DODAG, the DIO packet is discarded 515. If the node joins the DODAG, the node processes DIO and sets the MOP of the node based on its resources 520. If the NNC carried in DIO equals to zero 525, the node records DIO sender's MOP, sets the sender as its default parent and computes its rank 530, schedules 535 a DAO transmission, and transmits DIO with its MOP 540. If the NNC is not zero, the node records DIO sender's MOP and selects the DIO sender as a parent 545, but does not compute rank. Instead, the node starts 550 a timer to wait for more preferred DIOs.

If the DIO is for an existing DODAG, the node has selected at least one parent already and the node checks 555 if its rank is computed. If yes, the node checks 558 if its rank is greater than the rank carried in DIO. If no, DIO is discarded 515. If yes, the node checks 560 if enough parents have been selected, if no, the node records DIO sender's MOP and adds 565 sender to its parent set, if yes, node updates 570 its parent set by replacing one of the parents if this DIO contains a better route and the node also records DIO sender's MOP if the sender is added into its parent set. If its rank is not computed and the received DIO carries 575 a NNC=0, the node records DIO sender's MOP and sets 580 the sender as default parent, cancels 585 DIO waiting timers, compute 590 its rank and update its parent set by replacing one of existing parents if enough parents selected, the node then adjusts its MOP 593 if necessary, schedules 535 a DAO transmission and broadcast DIO 540 with its MOP. If the DIO has a NNC>0, the node adds DIO sender 560 to its parent set if not enough parents selected or otherwise updates 570 its parent set if enough parents selected. When DIO waiting timer expires 595, the node selects 598 one parent from parent set as default parent and computes its rank, adjusts its MOP 593 if necessary, schedules 535 a DAO transmission and transmits DIO packet 540 with its MOP.

To update set of parents of the node, criteria need to be defined to determine one route is better than another route. In one embodiment, a route with smaller NNC is considered better than a route with larger NNC if other metrics are similar.

A node initially sets its MOP based only on its resources. As DIO packet propagation continues, the node receives more information about its neighbors. If neighbors with more resources exist, in one embodiment a node changes its MOP to a lower value.

Before DIO packet transmission, a node computes its rank. Following is a resource aware rank computation method:

$$R=R_D+R_I+C_{NNC}*NNC+C_{MOP}*MOP \quad (2)$$

where $R_D$ is the rank of default parent, $R_I$ is the rank increase computed by using conventional routing metrics and object functions, $C_{NNC}$ and $C_{MOP}$ are the coefficients to reflect the importance of the NNC on default and MOP of default parent, respectively. These coefficients are selected such that a node has a smaller rank if it discovers better default route. Otherwise, node has a larger rank.

DAO Packet Construction

Downward routes are constructed using DAO packets. In some embodiments of the invention, the node constructs its DAO packets not only depending on its resources but also on resources of its parents. A node constructs its DAO packets as follows. First of all, a node with MOP=0 does not construct and transmit DAO packet, because such a node does not have resources to support downward routing. Also, the nodes do not send a DAO packet to a parent with MOP=0.

The nodes with the non-storing and the storing MOPs construct non-storing DAO packet for a non-storing parent. A storing node constructs a storing DAO packet for a storing parent. A non-storing node may construct either a storing or non-storing DAO packet for a storing parent. To construct a storing DAO, parent's link-local address is used as destination address and node's global address is used as source address. In one embodiment, a non-storing node constructs storing DAO for a storing parent because the storing DAO is more efficient than non-storing DAO due to lower communication overhead. Non-storing DAO is constructed same as RPL does. If the root sets its MOP≠0, the root can be considered as either a non-storing node or a storing node. For example, a storing node considers the root as a storing node and a non-storing node considers the root as a non-storing node.

Figure 6:
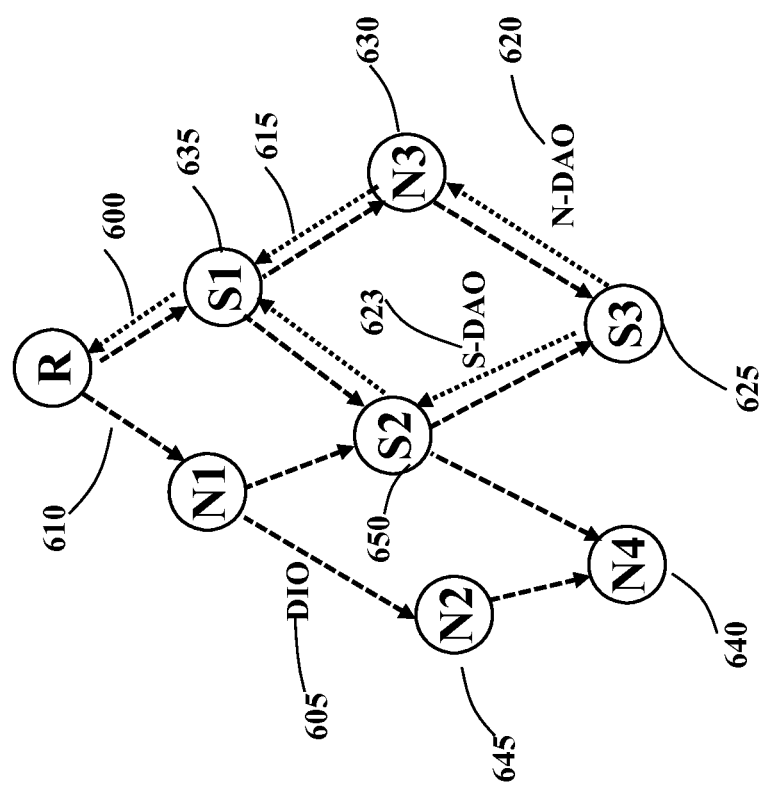
FIG. 6 is an example of a control packet routing according to some embodiments of the invention.

FIG. 6 shows an example of the DAO packet construction according to some embodiments of the invention. Nodes N1, N2, N3 and N4 are non-storing nodes. Nodes S1, S2 and S3 are storing nodes. The root R 600 propagates the DIO packet 605 along downward link 610 to all nodes in the network. Upward link 615 shows the DAO packet transmission. Node S3 625 constructs a non-storing DAO (N-DAO) 620 sent to parent N3 since N3 630 is a non-storing node. N-DAO 620 is sent to the root. Therefore, when N3 receives N-DAO from S3, it simply forwards the N-DAO to S1 635, which in turn forwards the N-DAO to R.

Conversely, S3 constructs a storing DAO (S-DAO) packet 623 sent to S2 650 since S2 is a storing parent. When S2 receives S-DAO, S2 adds a downward route entry for S3 and constructs an S-DAO containing destination S3 sent to S1, which does same as S2. Finally, R receives an S-DAO containing destination S3.

Acting Parenting for Resource Aware Downward Routing

Nodes with different resources have different MOPs. Nodes with different MOPs perform different routing functions. To support nodes with different MOPs in a heterogeneous network, extra workload incurs, because it is impractical to add more workload to nodes with fewer resources. Some embodiments shift extra workload to nodes with more resources.

In some embodiments, to implement routing with different MOPs, upward forwarding methods of the DAO packet of storing node are enhanced with help of noting of the "active parents". An acting parent of a node is a storing node on a route from the node to the root that satisfies following two conditions. There is no non-storing node between the node and the storing node on the route and the next hop of the storing node is a non-storing node. Therefore, in some embodiment, a node can be the active parent of a descendent node, wherein the descendent node is not a direct child of the node.

Figure 7A:
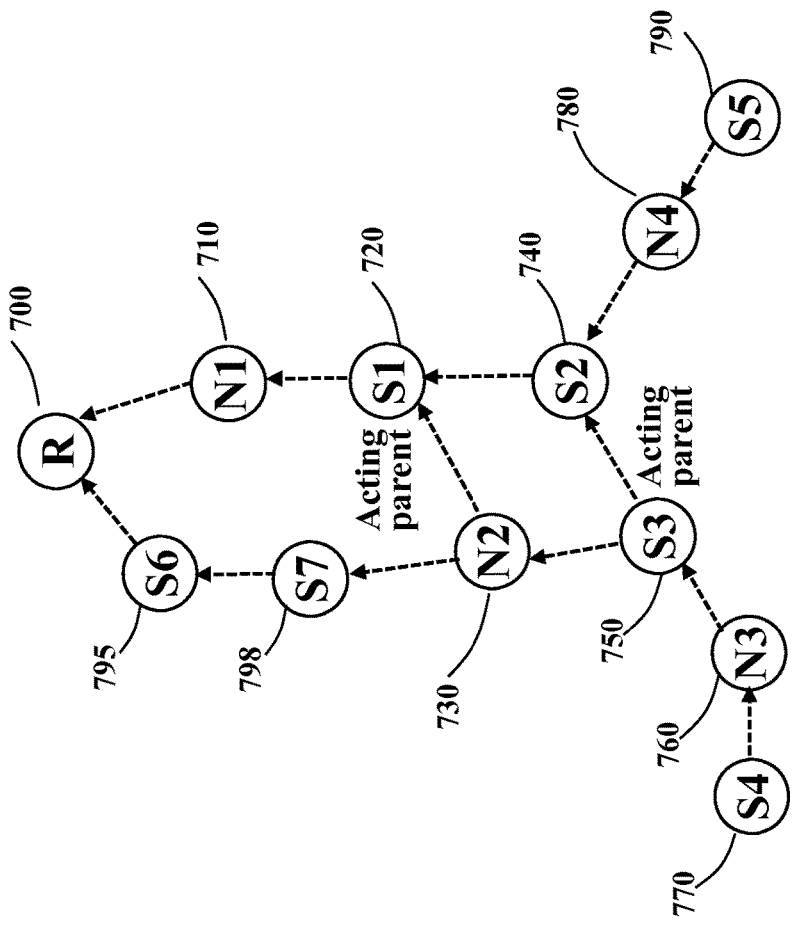
FIG. 7A is a schematic of an example of the network employing an acting parent node according to some embodiments of the invention.

FIG. 7A shows an example of the acting parent in which node R 700 is the root, N1 710, N2 730, N3 760, and N4 780 are non-storing nodes and S1 720, S2 740, S3 750, S4 770, and S5 790 are storing nodes. On the route S3→S2→S1→N1→R, S1 is acting parent of node S3. However, S2 cannot be acting parent of S3 since the next hop of the node S2 is a storing node S1. Assume N3 760 sends a storing DAO to S3, along route N3→S3→N2→S1→N1→R, S3 is acting parent of node N3.

An important property of the acting parent is that acting parent has route scope only, that is, a storing node can be acting parent of a node on one route, but may not be acting parent of same node on another route. For example, along route S3→N2→S1→N1→R, S1 cannot be acting parent of S3 since there is a non-storing node N2 in between S3 and S1.

An acting parent of the node can be its direct parent. For example, along route S2→S1→N1→R, S1 is acting parent of node S2. In fact, S1 is also the direct parent of S2.

Upon receiving a DAO packet, a storing node determines the need to perform acting parent role. A storing node receives DAO packets from the nodes in its sub-DODAG. If a DAO contains destinations that have no parents specified and the storing node intends to construct a non-storing DAO for those destinations and send the non-storing DAO to a non-storing parent, the storing node performs acting parent role by specifying itself as the parent of those destinations that do not have parents specified.

Acting parents provides a mechanism for the root or a storing node to build downward routes. Therefore, acting parents provide a mechanism to send downward packets in a network with different MOPs.

FIG. 7B shows a block diagram of a method for specifying child-parent relationship defining the active parenting according to some embodiments of the invention. The method is performed by a node if the MOP of the node is the storing MOP and an MOP of a parent of the node is the non-storing MOP.

The node receives 701 a control packet, e.g., the DAO, originated by a descendent node, wherein the descendent node is not a direct child of the node. The node tests 702 if the control packet includes a child-parent pair for the descendent node. If the child-parent pair is not in the control packet, the node adds 703 in the control packet the child-parent pair of the descendent node specifying that the descendent node is the direct child of the node and transmits 704 the control packet to ancestors of the node.

Compressed Network Converted by the Acting Parent

With the resource aware routing, the root or a storing node can send downward packets for some nodes by using routing table. However, the root or a storing node may need to build downward routes for other nodes.

In an example of FIG. 7A, the root transmitting the downward packets via S6 can use routing table, because the node S6 is a storing node. However, if the root sends downward packets via the non-storing node N1, the root needs to build downward routes. To build downward routes, the root R or a storing node uses child-parent pairs collected in the non-storing DAOs. Some of parents are direct parents, but some of parents are acting parents. With the presence of acting parent, the root or a storing node views network topology differently from actual network topology. In other words, acting parents in a network convert a network or a portion of network into a compressed network.

Figure 7C:
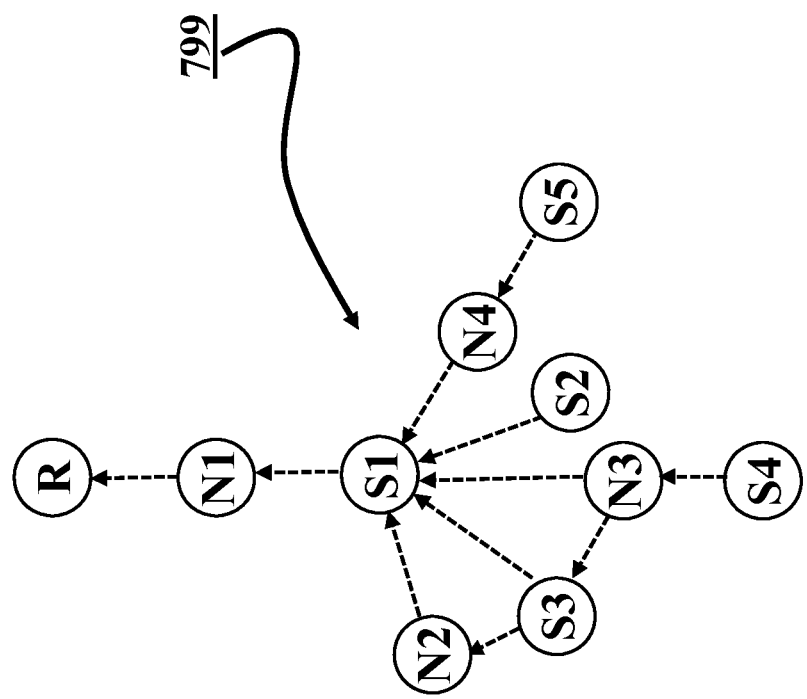
FIG. 7C is a schematic of an example of a transformation of the network of FIG. 7A due to the active parent according to some embodiments of the invention.

FIG. 7C shows a transform network 799 of FIG. 7A from the perspective of the root R. Due to the active parent role of the node S1, the sub-network of via N1 looks differently from the actual sub-network. Therefore, acting parents S1 and S3 convert the sub-network via N1 into a compressed network. The compressed network has a smaller network diameter than the original network. For example, the longest route in sub-network via N1 is six hops. However, the longest route in the compressed network 799 is only four hops. The compressed network can be used to build downward routes by the root or a storing node.

Compressed Routes Built from the Compressed Network

With the resource aware routing, the root or a storing node can build hop-by-hop downward routes for some nodes. However, the root or a storing node may not be able to construct hop-by-hop downward routes for other nodes.

Figure 8B:
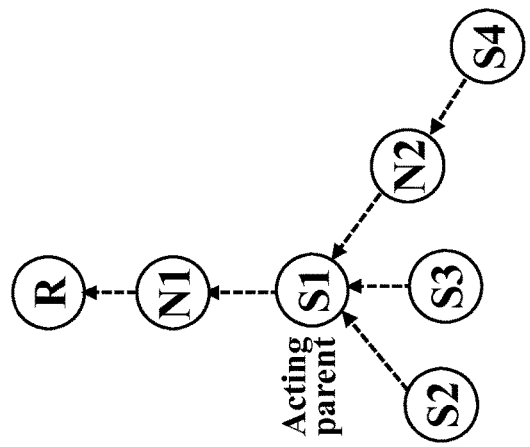
FIGS. 8A and 8B are schematics of compressing the routes in heterogeneous wireless networks according to some embodiments of an invention.
Figure 8A:
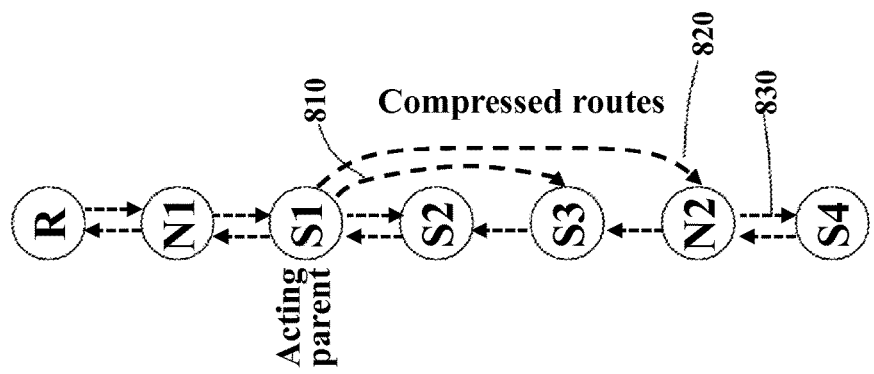

FIGS. 8A and 8B show schematics of compressing the routes in heterogeneous wireless networks according to some embodiments of an invention. In the example of FIG. 8A, nodes S2 and S3 generate storing DAO and S1 is the acting parent for the nodes S2 and S3. N2 also generates and transmits a storing DAO to S3 since a storing DAO is smaller in size. Therefore, S1 is also acting parent of node N2.

FIG. 8B shows the network of FIG. 8A from the perspective of the root R. The root can construct downward routes based on the compressed network. As a result, downward route to S3 looks like R→N1→S1→S3 810, downward route to N2 looks R→N1→S1→N2 820, and downward route to S4 looks like R→N1→S1→N2→S4 830. These routes are not hop-by-hop routes and in fact, they are compressed routes. Actual hop-by-hop downward route to S3 is R→N1→S1→S2→S3, actual hop-by-hop downward route to N2 is R→N1→S1→S2→S3→N2, and actual hop-by-hop downward route to S4 is R→N1→S1→S2→S3→N2→S4.

A compressed route is a downward route from the root or a storing node to a destination and a compressed route is constructed by using child-parent (or acting parent) pairs collected. The compressed route is advantageous because shorter than the hop-by-hop route in terms of hop count and reduces the communication overhead by shortening the source routing header. The root or a storing router can use a compressed route to deliver downward packets to the destination more efficiently.

A compressed route is not a hop-by-hop route. Therefore, on a compressed route, a node may not directly communicate with the next hop. For example, on the compressed route R→N1→S1→N2→S4 830, S1 may not directly communicate with next hop N2.

Taking compressed route R→N1→S1→N2→S4 830 as example to illustrate downward packet delivery by using the compressed route. The root R attaches a source routing header containing N1→S1→N2→S4 to the downward packet destined to S4 and forwards the packet to N1, which is a non-storing node and forwards the packet to S1 by using source routing header. When S1 receives the packet, the node S1 checks source routing header and identifies destination is S4. The node also checks its routing table for S4 and identifies next hop to S4 is S2, which is a storing node. Therefore, S1 removes source routing header from the packet and forwards the packet to S2 using its routing table.

When S2 receives the packet, the node S2 checks its routing table for destination S4 and finds next hop is S3, which is a storing node. Therefore, S2 forwards the packet to S3 using its routing table. When S3 receives the packet, S3 checks its routing table for S4 and determines next hop is N2, which is a non-storing node. Therefore, S3 needs to builds a downward route to S4. S3 checks its child-parent table and constructs a source routing header containing route N2→S4. S3 forwards packet to N2. N2 parses source routing header and forwards the packet destination S4.

Resource Aware DAO Processing and Forwarding Based on Acting Parent

The resource aware routing allows a node to determine DAO type based on its MOP and the MOP of parent to which the DAO is sent. To realize network with different MOPs, a new DAO forwarding mechanism is provided by some embodiments.

In one embodiment, a non-storing node does not process the DAO and simply relays the DAO to its default parent. Conversely, the root or storing node handles the received DAO differently. The root or a storing node needs to identify direct child and determine the MOP of a direct child. The root or a storing node stores the MOP for each direct child. One embodiment does not require any modification to DAO format. Instead, the embodiment identifies the direct child and the MOP of a direct child according to the following principles.

If both a source address and a destination address are link-local address, the DAO sender is a direct child and this direct child is a storing node. If source address is a global address and destination address is link-local address, then the DAO sender is a direct child and this direct child is a non-storing node. If both source address and destination address are global address, then the root or storing node checks parent field of the source node. If the source node specifies the root or storing node as parent, then the source node is a direct child and this direct child is a non-storing node. Otherwise, the source node is not a direct child.

For example, in one embodiment, the root processes a storing DAO by adding a route entry into routing table for each destination contained in the DAO and by determining and storing the MOP of a direct child. The root processes a non-storing DAO by adding a route entry into routing table for each destination contained in the DAO, storing child-parent (or acting parent) pair for each destination contained in the DAO received from a non-storing child, and determining and storing the MOP of a direct child.

A storing node processes a storing DAO as follows. If the intended parent on a route is a storing node, then the node adds a route entry into routing table for each destination contained in the DAO, determines and stores the MOP of a direct child and constructs a storing DAO and sends the storing DAO to the storing parent.

If the intended parent on a route is a non-storing node, then the node adds a route entry into routing table for each destination contained in the DAO, determines and stores the MOP of a direct child, constructs a non-storing DAO by performing acting parent role, and forwards the DAO to the non-storing parent. The node can construct a non-storing DAO by performing acting parent role. For example, in the IPv6 header, the destination address is a unique IPv6 address of the root and source address is the unique IPv6 address of the storing node. If a destination node does not specify the parent, then the storing node specifies the node is a parent of the destination node.

A storing node processes a non-storing DAO by adding a route entry into routing table for each destination contained in the DAO, storing child-parent (or acting parent) pair for each destination contained in the non-storing DAO received from a non-storing child, determining and storing the MOP of a direct child, and relaying the DAO to its default parent.

For example, in FIG. 7A, node S4 sends a non-storing DAO to N3, which forwards the DAO to S3. When S3 receives the DAO, the node S3 stores a route entry for S4 and a child-parent entry for S4 since S3 received a non-storing DAO from a non-storing child N3. S3 then forward the DAO to S2. However, S2 only adds a route entry for S4, but does not add child-parent entry for S4 since the non-storing DAO was received from a storing child.

In some embodiments, the root maintains two tables for all nodes in the network, i.e., a routing table that stores downward route entries for all destinations received via storing DAOs and a child-parent table stores child and parent (or acting parent) pairs for all destinations received via non-storing DAO packets Additionally or alternatively, a storing node maintains two tables for all nodes in its sub-DODAG, i.e., a routing table that stores downward route entries for all destinations received via storing DAOs, and a child-parent table stores child and parent (or acting parent) pairs for all destinations received via non-storing DAO packets.

A node can have entries in both routing table and child-parent table. For example, in FIG. 4A, if node S6 selects both N4 and S5 as DAO parents, S6 sends a non-storing DAO to N4 and sends a storing DAO to S5. As a result, S6 is in R's child-parent table with an entry S6's parent is N4 and is also in R's routing table with an entry next hop to S6 is S1.

Resource Aware Downward Route Construction Based on Compressed Network

The root or a storing node can construct downward routes to send downward packets. A downward route can be a hop-by-hop route or a compressed route.

Based on a compressed network, the root constructs downward routes as follows:

Initialization
  Build two sets
    Start Set (SS)={All nodes in the network the root learned from non-storing DAOs received from non-storing children}
    Finish Set (FS)={Root}
  Set route=(Root), which is the start of all downward routes from the root.
  Set Ref_Rank=Root_Rank+1

Downward route construction
  Check if any node in SS having a rank equal to Ref_Rank
    If no, increase Ref_Rank by 1 and continue
    If yes, find parents in FS for this node by using child-parent table
      If a parent (or acting parent) is found, attach this node to the route built for the parent, store the route and continue
      If no parent is found, this is an error and stop
      After searching FS for this node, move to next node in SS with rank=Ref_Rank
    After searching all nodes in SS with rank=Ref_Rank, move these nodes from SS to FS
    Increase Ref_Rank by 1 and continue
  The process completes when SS becomes empty
  If the process is stopped due to error, the root may trigger the nodes with missing information by transmitting a DIO with increased DAO Trigger Sequence Number (DTSN).

A storing node constructs downward routes similarly as the root does. Only difference is initialization, in which a storing node sets SS={All nodes in its sub-DODAG the storing learned from non-storing DAOs received from non-storing children}, FS={Storing node} and Ref_Rank=Rank of the storing node plus 1.

FIG. 9A shows an example of the downward route construction by the root based on the compressed network in FIG. 9B. The root R builds downward routes as follows:
  R sets SS={N1, S1, N2, S2, S3, N3, S4}, FS={R}, Route=(R), and Ref_Rank=Root_Rank+1=2
  Start from Ref_Rank=2
    N1's rank=2 and N1's parent is R, route for N1 is (R→N1), move N1 to FS so that SS={S1, N2, S2, S3, N3, S4} and FS={R, N1}
  Increase Ref_Rank to 3
    S1's rank=3 and S1's parent is N1, route for S1 is (R→N1→S1), move S1 to FS so that SS={N2, S2, S3, N3, S4} and FS={R, N1, S1}

Increase Ref_Rank to 4
  N2's rank=4 and N2's parent is S1, route for N2 is (R→N1→S1→N2); S2's rank=4 and S2's acting parent is S1, route for S2 is (R→N1→S1→S2). Move N2 and S2 to FS so that SS={S3, N3, S4} and FS={R, N1, S1, N2, S2}
Increase Ref_Rank to 5
  S3's rank=5 and S3's parent is N2 and acting parent is S1, route-1 for S3 is (R→N1→S1→N2→S3) and route-2 (compressed) for S3 is (R→N1→S1→S3); N3's rank=5 and N3's acting parent is S1, route (compressed) for N3 is (R→N1→S1→N3). Move S3 and N3 to FS so that SS={S4} and FS={R, N1, S1, N2, S2, S3, N3}
Increase Ref_Rank to 6
  S4's rank=6 and S4's parent is N3, route (compressed) for S4 is (R→N1→S1→N3→S4), move S4 to FS so that SS={empty} and FS={R, N1, S1, N2, S2, S3, N3, S4}
Increase Ref_Rank to 7
  SS is empty, process completes
In this example, node N3 sends storing DAO to S2. If N3 sends non-storing DAO to S2, the routes for N3 and S4 will be real routes instead of compressed routes.

Resource Aware Downward Packet Forwarding Using Compressed Routes

According to various embodiments of the invention, the root or a storing node has three ways to forward a downward packet to destination, i.e., using source routing, using routing table, or via combination of source routing and routing table as well as child-parent table. It is possible that the root or a storing router has multiple choices to send a downward packet. However, one embodiment sends downward packet using routing table, because the routing table does not need source routing header and packet is smaller in size. Smaller packet has higher delivery reliability.

The root or a storing node attaches a source routing header to a downward packet if next hop on the route is a non-storing node. A source routing header includes a downward route that can be a hop-by-hop route or a compressed route. During a downward packet relay, a storing node can remove source routing header to make packet smaller.

A non-storing node does not store any downward route information for other nodes. The non-storing node only uses source routing header to forward downward packets. When a non-storing node receives a downward packet for forwarding and the packet contains a source routing header, the node forwards packet to next hop by following source routing header. When a non-storing node receives a downward packet for forwarding and the packet does not contain a source routing header, the node checks reachability of the destination. If the destination is reachable, then the node uses direct P2P forwarding the packet. If the destination is not reachable, then the node forwards packet to a default parent.

If a storing node receives a downward packet for forwarding and the packet contains a source routing header, then the node uses source routing header when the destination is not in its routing table, or the next hop is a non-storing node. If the destination is in its routing table and next hop is a storing node, then the node removes source routing header from the packet and forwards the packet using routing table because removing source routing header makes packet smaller. When a storing node receives a downward packet for forwarding and the packet does not contain a source routing header, the node forwards packet to next hop via routing table if the destination is in its routing table and next hop is a storing node. If the destination is in its routing table and next hop is a non-storing node, the node attaches a source header and forwards packet to next hop. If the destination is not in its routing table, the node checks reachability of the destination. If the destination is reachable, the node uses direct P2P forwarding the packet. If the destination is not reachable, it forwards packet to its default parent.

When a storing node receives a downward packet for forwarding and the packet contains a source routing header, the node can replace longer source routing header with a shorter source routing header.

Figure 10:
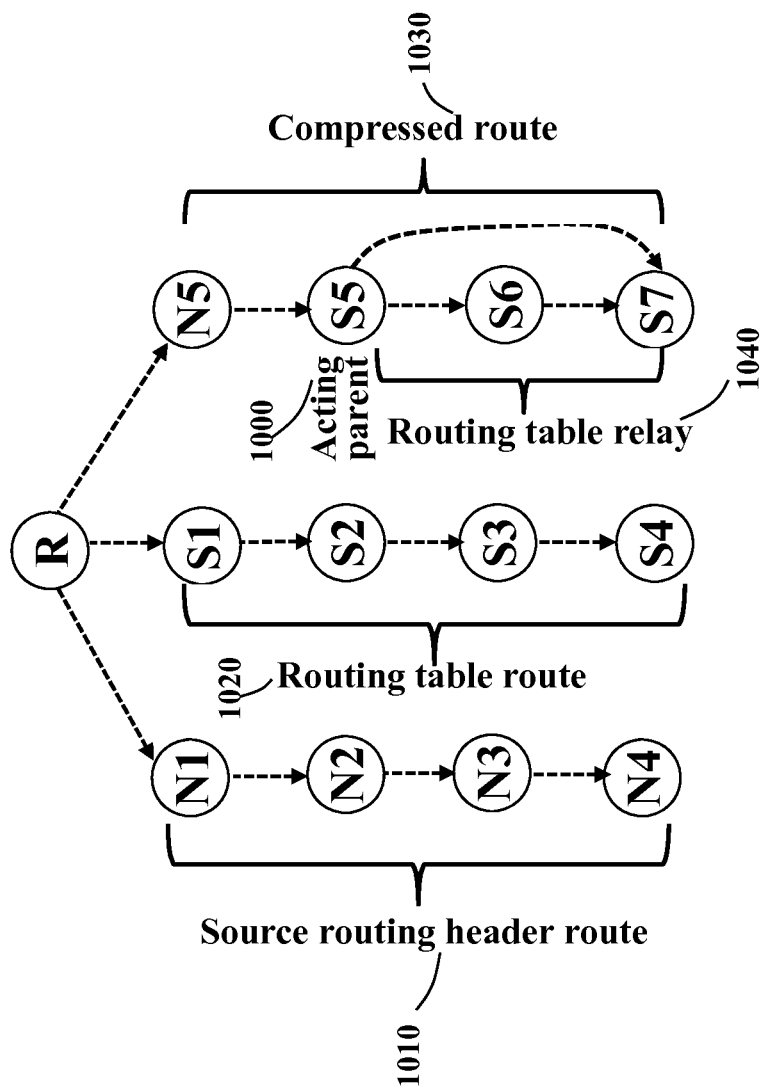
FIG. 10 is a schematic of three ways of sending a downward packet to a destination according to some embodiments of an invention.

FIG. 10 shows a schematic of three ways of sending a downward packet to the destination. The root R uses source routing header 1010 to send downward packets to N4 since all nodes on the route are non-storing nodes. The root R uses routing table 1020 to send downward packets to S4 since all nodes on the route are storing nodes. The root R uses compressed route 1030 send downward packets to S7 since nodes on the route have different MOPs. To send a packet to S7, R attaches a source routing header having a compressed route N5→S5→S7 and forwards packet to N5, which is non-storing node and therefore, forwards the packet to S5 1000, which is acting parent of S7. S5 has a routing table entry for S7 and next hop is S6 that is storing node. S5 removes source routing header from the packet and forwards the packet to S6, which in turn forwards packet to S7. From S5 to S7 the packet is relayed by using routing table 1040.

Adaptive MOP Change Based on Resources Usage and Network Conditions

In some embodiments, the nodes signal available resources during operation of the heterogeneous network. For example, if a battery level of a battery-powered node becomes low, the node can go to sleep to save energy. In this case, it is not desirable to use this battery-powered node relaying packets for other nodes even this battery-powered node has sufficient memory space and processing speed.

Some embodiments of the invention allow nodes in a heterogeneous network to signal their resource usage via changing MOPs. If a node decreases its MOP, the broadcasted modified MOP indicates that the node is cautious about its resources. If a node increases its MOP, the broadcasted modified MOP indicates the node obtains more resources. Therefore, in one embodiment, when a node changes its MOP, the node sends a DIO to announce the change.

For example, when a node with MOP-0 increases its MOP, the node schedules a DAO transmission. In response to the DAO transmission, direct children of the node can update the MOP for this parent and can add this parent into DAO parent set. Also, the neighboring nodes can add this node into their parent set.

When a non-storing node changes its MOP to a storing mode, direct children of the node can update the MOP for this parent. Also, a storing child schedules a DAO, in which this storing child removes its acting parent role because next hop on upward route is now a storing node.

When a storing node changes its MOP to non-storing mode, the direct children of the storing node can update MOP for this parent. Also, a storing child schedules a non-storing DAO, in which this storing child takes acting parent role for nodes in its sub-DODAG that do not have parent specified.

When a storing node or a non-storing node decreases the MOP to 0, the direct children of the node update MOP for this parent, and a direct child that has this parent as DAO parent removes this parent from DAO parent set and generates a new DAO to reflect this change.

FIG. 11 shows a block diagram of an adaptive MOP change of the node according to some embodiments, wherein the MOP of the node is the storing MOP. The node receives 1110 the MOP of a parent of the node and tests 1120 the type of a change of the MOP. The node transmits 1130 a control packet with a child-parent pair indicating that a descendent node is a direct child of the node, if the MOP of the parent is changed from the storing MOP to the non-storing MOP. If the MOP of the parent is changed from the non-storing MOP to the storing MOP, the node removed 1140 the child-parent pair for the descendent node from the control packet and transmit the control packet.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format. The processor can be connected to memory, transceiver, and input/output interfaces as known in the art.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for routing packets in a multi-hop wireless heterogeneous network including nodes with different computational and energy resources, comprising:
    monitoring a set of parameters of an operation of a node in the network, wherein the operation includes routing packets to the nodes of the network according to a mode of operation (MOP) specifying a type of the routing, wherein the MOP is a non-storing MOP or a storing MOP, wherein the node operating according to the non-storing MOP does not store a routing table, and wherein the node operating according to the storing MOP stores the routing table and child-parent table specifying child-parent pairs for at least part of the network, wherein the MOP of the node is the storing MOP and an MOP of a parent of the node is the non-storing MOP, further comprising:
        receiving the control packet originated by a descendent node, wherein the descendent node is not a direct child of the node;
        testing if the control packet does not include a child-parent pair for the descendent node;
        adding in the control packet, if the child-parent pair is not in the control packet, the child-parent pair of the descendent node specifying that the descendent node is the direct child of the node; and
        transmitting the control packet to ancestors of the node;
    modifying the MOP of the node in response to detecting a change in at least one parameter of the operation;
    broadcasting information about the modified MOP to the network; and
    routing the packets to the nodes according to the modified MOP, wherein steps of the method are performed using a processor of the node.

2. The method of claim 1, wherein the set of parameters includes one or combination of an available memory of the node, a processing power of the node, an available amount of energy for the node, a communication capability of the node, and an MOP of at least one neighboring node.

3. The method of claim 1, wherein the packets are control packets.

4. The method of claim 1, wherein the packets include destination advertisement object (DAO) packets, wherein the MOP of the node is the storing MOP, and wherein the node includes an identification of a parent of the node into the DAO.

5. The method of claim 4, further comprising:
    receiving the control packet originated by a descendent node, wherein the descendent node is not a direct child of the node;
    adding a child-parent pair of the descendent node in the control packet specifying that the descendent node is the direct child of the node; and
    transmitting the control packet to ancestors of the node.

6. The method of claim 1, further comprising:
    determining current values of the set of parameters of the operation of the node;
    comparing the set of parameters with a corresponding set of thresholds; and
    determining the MOP of the node based on the comparing.

7. The method of claim 1, further comprising:
    determining current values of the set of parameters of the operation of the node;
    determining a resource parameter as a weighted combination of the current values of the set of parameters; and
    comparing the resource parameter with a threshold to produce the MOP of the node.

8. The method of claim 7, wherein the resource parameter is determined according to $$RP = \left(\frac{AM}{MC}\right)^{CM} \times \left(\frac{AR}{RC}\right)^{CR} \times \left(\frac{EL}{ME}\right)^{CE} \times \left(\frac{1}{SS}\right)^{CN},$$

where RP is a combined resource and network condition parameter, AM is an available random access memory (RAM), MC is capacity of the RAM, AR is an available read only memory (ROM), RC is capacity of the ROM, EL is a level of energy of available to the node, ME is the maximum energy level, SS is a size of a sub-DODAG of the node, CM, CR, CE and CN are positive coefficients for weighting importance of the parameters of operation.

9. The method of claim 1, wherein the broadcasting comprises:
    generating a destination oriented directed acyclic graph information object (DIO) including the MOP of the node; and
    broadcasting the DIO in the network.

10. The method of claim 9, further comprising:
    adding a non-storing node count (NNC) to the DIO.

11. The method of claim 10, further comprising:
    receiving the NNC as part of the DIO originated by a root node in the network; and
    increasing the NNC by one if the MOP of the node is a non-storing MOP.

12. The method of claim 11, further comprising:
receiving multiple copies of a destination oriented directed acyclic graph information object (DIO) originated by a root node in the network, each copy of the DIO is received from one of multiple neighboring nodes and includes a non-storing node count (NNC); and
selecting a subset of the neighboring nodes transmitting the DIO with smaller NNC as parents of the node.

13. The method of claim 1 wherein the MOP of the node is the storing MOP, further comprising:
receiving a MOP of a parent of the node;
generating a destination advertisement object (DAO) packet by specifying the parent and transmitting the DAO to ancestor nodes;
transmitting a control packet with a child-parent pair indicating that a descendent node is a direct child of the node, if the MOP of the parent is changed from the storing MOP to the non-storing MOP; and
removing the child-parent pair for the descendent node from the control packet and transmitting the control packet, if the MOP of the parent is changed from the non-storing MOP to the storing MOP.

14. The method of claim 1, wherein the MOP of the node is the non-storing MOP, further comprising:
receiving a MOP of a parent of the node; and
generating a destination advertisement object (DAO) packet without specifying the parent and transmitting the DAO to ancestor nodes.

15. A multi-hop wireless network including multiple nodes with different computational and energy resources, wherein the nodes operate according to different mode of operation (MOP) specifying types of routing, wherein the MOP is a non-storing MOP or a storing MOP, wherein the node operating according to the non-storing MOP does not store a routing table, and wherein the node operating according to the storing MOP stores the routing table and child-parent table specifying child-parent pairs for at least part of the network, wherein the MOP of the node is the storing MOP and an MOP of a parent of the node is the non-storing MOP, further comprising:
receiving the control packet originated by a descendent node, wherein the descendent node is not a direct child of the node;
testing if the control packet does not include a child-parent pair for the descendent node;
adding in the control packet, if the child-parent pair is not in the control packet, the child-parent pair of the descendent node specifying that the descendent node is the direct child of the node; and
transmitting the control packet to ancestors of the node, wherein at least one node in the network modifies the MOP of the node in response to a change of a parameter of operation of the node.

16. The network of claim 15, wherein the node is configured for
receiving the control packet originated by a descendent node, wherein the descendent node is not a direct child of the node;
adding a child-parent pair of the descendent node in the control packet specifying that the descendent node is the direct child of the node; and
transmitting the control packet to ancestors of the node.

17. A node for routing packets in a heterogeneous wireless network, comprising:
a battery for supplying energy to the node;
a transceiver for transmitting and receiving packets;
a memory for storing at least part of the packets; and
a processor for monitoring one or combination of an available amount of energy of the power supply and an available portion of the memory and for determining a mode of operation (MOP) of the node specifying a type of routing of the packets based on one or combination of the available amount of energy and the available portion of the memory, wherein the MOP is a non-storing MOP or a storing MOP, wherein the node operating according to the non-storing MOP does not store a routing table, and wherein the node operating according to the storing MOP stores the routing table and child-parent table specifying child-parent pairs for at least part of the network, wherein the MOP of the node is the storing MOP and an MOP of a parent of the node is the non-storing MOP, further comprising:
receiving the control packet originated by a descendent node, wherein the descendent node is not a direct child of the node;
testing if the control packet does not include a child-parent pair for the descendent node;
adding in the control packet, if the child-parent pair is not in the control packet, the child-parent pair of the descendent node specifying that the descendent node is the direct child of the node; and
transmitting the control packet to ancestors of the node.

18. The node of claim 17, wherein the processor commands the transceiver to broadcast information about the MOP to the network in response to modifying the MOP.

* * * * *